United States Patent [19]

Fallon

[11] Patent Number: 4,985,846

[45] Date of Patent: Jan. 15, 1991

[54] ACOUSTICAL/OPTICAL BIN PICKING SYSTEM

[76] Inventor: Patrick J. Fallon, 17255 Ridge Rd., Northville, Mich. 48167

[21] Appl. No.: 350,164

[22] Filed: May 11, 1989

[51] Int. Cl.$^5$ ............................................. G06F 15/46
[52] U.S. Cl. .................................... 364/513; 364/468; 358/101; 382/8
[58] Field of Search .................... 364/513, 468, 478; 358/101, 107; 382/8, 25; 901/47

[56] References Cited

U.S. PATENT DOCUMENTS

| | | | |
|---|---|---|---|
| 3,804,270 | 4/1974 | Michaud et al. | 214/16 B |
| 4,017,721 | 4/1977 | Michaud | 235/151.3 |
| 4,169,758 | 10/1979 | Blackstone et al. | 176/19 R |
| 4,305,130 | 12/1981 | Kelley et al. | 364/513 |
| 4,402,053 | 8/1983 | Kelly et al. | 364/513 |
| 4,412,293 | 10/1983 | Kelley et al. | 364/513 |
| 4,613,269 | 9/1986 | Wilder et al. | 364/513 |
| 4,613,942 | 9/1986 | Chen | 364/513 |
| 4,634,947 | 1/1987 | Magori | 318/568 |
| 4,674,057 | 6/1987 | Caughman et al. | 364/513 |
| 4,680,802 | 7/1987 | Nishida et al. | 382/8 |
| 4,704,694 | 11/1987 | Czerniejewski | 364/513 |
| 4,731,856 | 3/1988 | Lloyd et al. | 382/8 |
| 4,821,206 | 4/1989 | Arora | 364/513 |

OTHER PUBLICATIONS

Article: "Research Directions in Industrial Machine Vision: A Workshop Summary" Author: John F. Jarvis, Bell Laboratories, Dec. 1982, Computer, pp. 55–61.
Article: "Industrial Electronics" Authors: Robert M. Lougheed and Robert E. Sampson Machine Vision and Applications 1988 pp. 41–57.

Primary Examiner—Allen MacDonald
Attorney, Agent, or Firm—Harness, Dickey & Pierce

[57] ABSTRACT

A bin picking system for a robot manipulator arm using a combination of a video camera and an acoustical transducer array to locate and drive the manipulator arm to grasp randomly oriented, overlapping parts. The system comprises memory for storing an image of the part showing a predetermined feature in a predetermined orientation; acoustic transducer mounted on the manipulator arm for emitting and receiving acoustic signals and converting the acoustic signals to electrical signals; and first control for sluing the manipulator arm over a predetermined area of the bin to locate the closest part and generate a bearing signal representative of the bearing and distance to the part. The system includes a video device for capturing a current image of the part at this bearing and comparing the image with the stored image to identify and locate the feature; means for calculating a drive bearing to the centroid of the part from the location of the feature and the bearing signal and moving the manipulator along the drive bearing to a predetermined distance from the part; acoustic transducer array mounted on the manipulator for emitting and receiving acoustic signals and converting the received signals to electrical signals proportional to the aspect of the object when the manipulator is positioned the predetermined distance from the object along the drive bearing; and second control means for interpreting the electrical signals from the array means and comparing these signals to a stored image to produce an error drive signal to the manipulator.

5 Claims, 5 Drawing Sheets

ACOUSTICAL/OPTICAL BIN PICKING SYSTEM

BACKGROUND AND SUMMARY OF THE INVENTION

This invention relates generally to robot manipulators and particularly to a system of control for a robot manipulator to pick an individual part from a bin or container of multiple parts.

Bin picking by a robot manipulator in real time is a complex problem for roboticists. No simple sure visual method presently exists to compensate for the problem of overlapping geometry which is encountered in a supply bin of randomly oriented parts. The contemplated solutions to the problem of bin picking and overlapping geometry have required extremely complex image processing systems. One such system is described in an article by Longheed and Sampson, entitled "3-D Imaging Systems And High Speed Processing For Robot Control", *Machine Vision And Applications*, Vol. 1:41–57 (1988).

These complex image processing systems require a substantial time period to process input data from the video devices. This processing time may be unsatisfactory in a fast paced manufacturing environment. Accordingly, the need for a simple approach is needed in order to provide a real time, economical solution to the overlapping geometry problems encountered in typical manufacturing environments.

It is therefore an object of the present invention to provide a simple, economical control system for readily determining a closest part in a bin of randomly oriented parts.

It is another object of the present invention to provide a bin picking system utilizing acoustic transducers operatively coupled to a video camera.

It is another object of the present invention to provide a system for repetitively grasping individual parts in a predetermined orientation from a bin of unoriented, overlapping parts.

The bin picking system in accordance with the present invention comprises a robot manipulator arm having acoustic transducers mounted thereon, a system controller, a video camera and a laser spotter. The controller directs the movement of the robot manipulator arm, camera and spotter. The camera and spotter are used to locate a feature on an individual part in a bin of randomly oriented parts.

The robot manipulator arm includes a conventional articulated wrist having a gripper assembly attached thereto. The gripper assembly is basically a mechanical hand with a pair of opposing fingers and a centrally mounted acoustic transducer. The acoustic transducer mounted on the robot manipulator arm is used to determine the relative bearing between the robot manipulator arm and the part in the bin closest to the manipulator arm. An array of four acoustic transducers is mounted to the mechanical hand. Each transducer is symmetrically spaced from the center of the mechanical hand. The array is used to determine the aspect, or orientation of the part with respect to the manipulator arm.

The wrist is designed to slue the gripper assembly back and forth over the bin to locate the closest part by virtue of echo location from the central acoustic transducer. The central transducer is activated periodically as the wrist is slued over the bin, using pulses in the two to three kilohertz range. The pulses are spaced in time so as to strike the surface of the bin at approximately one inch intervals. The echoes received back from the bin are evaluated by the controller to determine the closest part by measuring the phase shift of the echoes.

Once the closest part is determined, the controller generates a bearing to this part and sends this bearing to a video camera which is aimed along the bearing. The camera takes a video image or picture of the tentatively identified part. This picture is then compared by the controller module to a stored image of the part in the memory portion of the controller module in order to locate a predetermined feature on the part. When this feature is tentatively identified, another bearing is generated by the control module to the feature. A laser beam is directed along this bearing. The laser beam provides a pin point of light which then is reflected off of the feature and back to the video camera. If the feature has been correctly identified and located, the reflected laser light will have a certain grayscale value.

The video camera receives an image of this reflected laser light and the controller evaluates the intensity of the reflection to determine if it is within the prescribed range of values. If it is, the location of the feature on the part has been confirmed. If it is not, the sequence of steps above described is then repeated for a different area of the bin. Alternatively, the bin may be shaken or shuffled and the above described process is repeated until a part with a given feature is confirmed.

Once confirmation has taken place, the centroid of the part is calculated by the control module and a bearing from the robot manipulator arm to the centroid is determined. The manipulator arm is then driven to a predetermined distance from the centroid and stopped. The planar array of acoustic transducers is then activated to determine the tilt or aspect of the part. An error signal is generated by a comparison of the echo signal intensities to stored expected values at this predetermined distance from the part, and a drive signal is generated which is proportional to the error. The robot manipulator arm is then driven by the error signal until the error signal is nulled.

The position of the robot manipulator arm which nulls the error signal corresponds to the correct position for grasping the part. Once the error signal is nulled, the control module directs the gripper assembly on the end of the robot manipulator arm to grasp the part and then move the part in accordance with the prescribed manufacturing sequence. The above described sequence is then repeated to locate and pick the next and each subsequent part from the bin. The use of acoustic transducers and video thus eliminates the need for a complex 3-dimensional image processing system and simplifies the identification of particular features on a part in a real time processing system.

Other objects, features and advantages of the present invention will become apparent to those skilled in the art to which this invention relates from a consideration of the following detailed description and the appended claims, taken in conjunction with the accompanying drawings.

DETAILED DESCRIPTION OF THE INVENTION

Figure 1:
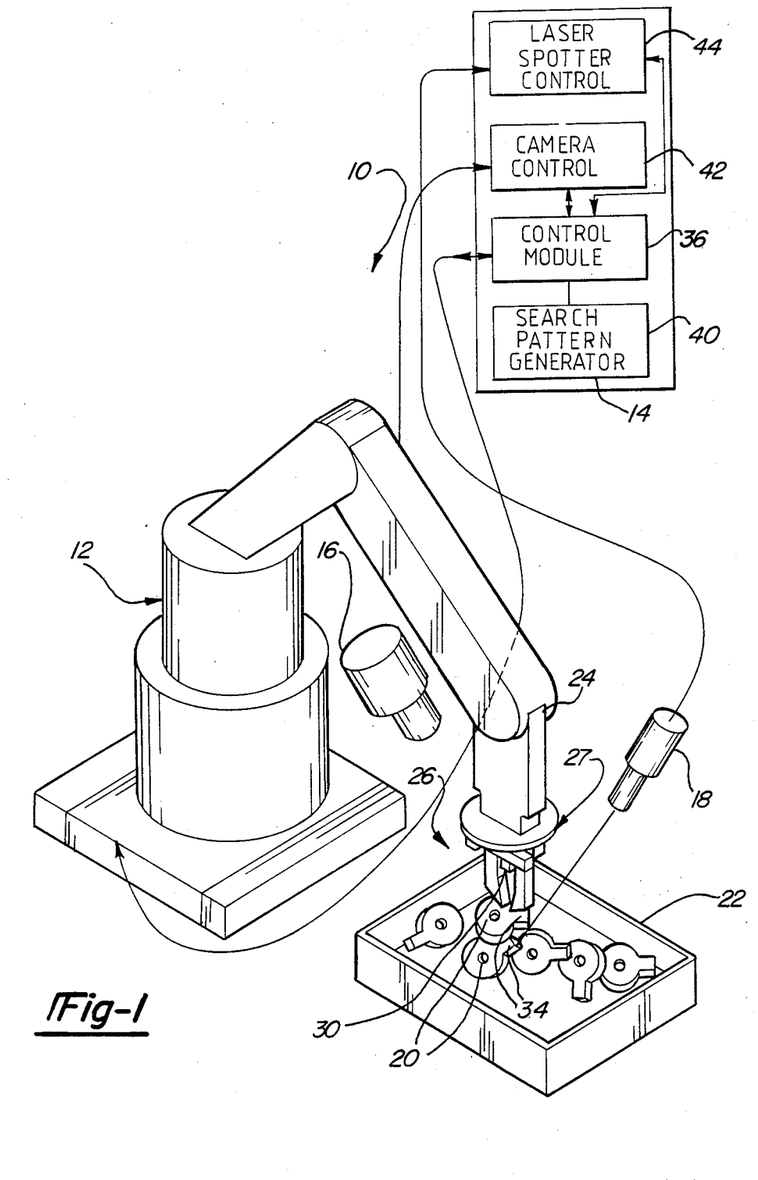
FIG. 1 is a schematic representation of the bin picking system according to the present invention.

A bin picking system in accordance with this invention is shown pictorially in FIG. 1 and is generally designated by the reference numeral 10. The bin picking system 10 comprises a robot manipulator arm 12 having acoustic transducers mounted thereon, a system controller 14, a video camera 16, and a laser spotter 18. The controller 14, camera 16, and spotter 18 are used to direct the manipulator arm 12 to select and precisely grasp an object or part 20 from a bin 22 of identical randomly oriented parts 20 as will be subsequently described.

The robot manipulator 12 includes an articulated wrist 24 and a gripper assembly 26 attached to the wrist 24. The gripper assembly 26 is basically a mechanical hand having a pair of opposing fingers 28 and has a central acoustic transducer 30 disposed between the fingers 28. A planar array of four acoustic transducers 32 is spaced symmetrically around and supported from the gripper assembly 26.

The wrist 24 is designed to slue the gripper assembly 26 over a portion of bin 22 such as one quadrant to locate the closest part 20. The central transducer 30 is also used to determine the distance and bearing to the closest part 20 in bin 22. The central transducer 30 is controlled by controller 14 so a to produce periodic acoustical pulses in the two to three kilohertz range. The reflected echoes from the bin 22 are then evaluated by the controller 14 to determine the distance and bearing to the closest part 20. The repetition rate is designed so that they strike the grid area of the quadrant over which the gripper assembly 26 is slued in intervals of approximately one inch.

The camera 16 is used to locate a specific predetermined feature 34 on the object 20. This feature 34 is then utilized to orient the gripper assembly 26 in a predetermined relation with respect to the feature 34 so that the part 20 can be grasped in a predetermined orientation. The laser spotter 18 is used to confirm the location of the feature. The planar array 32 is used to determine the aspect or tilt of the object 20. Finally, the planar array 32 is also used to generate a drive error signal to the robot manipulator to position the gripper assembly 26 properly for grasping the part 20.

The bin picking system in accordance with the present invention is specifically designed to allow the remote robot manipulator 12 to selectively and repetitively choose a part 20 from the bin 22 and grasp the part 20 in the same orientation. The basic operation of the bin picking system invention involves first positioning and sluing the gripper assembly 26 over a portion of the bin 22. The central transducer 30 is pulsed intermittently during this sluing. Echoes received by transducer 30 are then evaluated by the controller 14 to determine the closest echo location. This echo location then corresponds to the bearing to the closest part 20. This bearing is then translated and transmitted by the controller 14 to the video camera 16 which is then aimed along an intersecting bearing. The camera then records an image and the controller 14 compares the image to a previously stored image in order to locate a particular feature 34 on the part 20.

Once the feature 34 is tentatively identified, a bearing to the feature 34 is calculated by controller 14. Laser 18 is then directed by controller 14 to transmit a light beam on this bearing to feature 34. A particular greyscale value is expected to be reflected off of the feature 34 and received by camera 16 if the target is indeed the correct feature 34. If this particular greyscale is in turn sensed by camera 16, the feature 34 and its bearing are confirmed.

The controller 14 then calculates the centroid of the part 20 and the bearing from the gripper assembly 26 to the centroid of the part 20. The gripper assembly 26 is then driven to a position a predetermined distance from the part 20 along the centroid bearing.

The planar acoustic array 32 is then activated to determine the aspect or tilt of the part 20. The aspect is required in order to properly orient gripper assembly 26 to grasp part 20. Controller 14 processes the reflected echo pulses from the acoustic planar array 32 and generates an error signal proportional to the error between the position of the gripper assembly 26 and the position of part 20. The gripper assembly 26 is then driven along the centroid bearing until the error signal is nulled. When the error signal is nulled, gripper assembly 26 is in position to grasp part 20 with feature 34 in the predetermined orientation.

Thus the bin picking system in accordance with the present invention utilizes acoustic transducers 30 and 32 to generate the bearing and aspect between the gripper assembly 26 and a randomly oriented part 20 in the bin 22. The video camera 16 is utilized to identify and locate the particular feature 34 of the part 20.

The positions of camera 16, laser spotter 18 and gripper assembly 26 with relation to each other are constantly recorded by the controller 14. In addition, the controller is taught, prior to the actual bin picking operation, the particular shape of the part 20 and the location and identification of the feature 34 by recording in digital memory a stored image of the part 20 and the specific feature 34.

The controller 14 includes a computerized control module 36, digital storage media and a microprocessor which processes and directs electrical signals to and from the laser spotter, the video camera 16, and the robot manipulator 12 to produce appropriate drive signals to the robot manipulator 12. In addition, the control module 36 stores the learned image of part 20 with the feature 34 identified and performs the comparison between the current image through camera 16 with the stored image.

Control module 36 is also programmed to perform the calculations to determine the centroid of the gripper assembly 26 and the centroid of the part 20 once the feature 34 has been identified and confirmed. Finally, the control module 36 generates and directs the drive error signal which is fed to the robot manipulator to drive the gripper assembly 26 into proper alignment for grasping part 20 with fingers 28.

Figure 2:
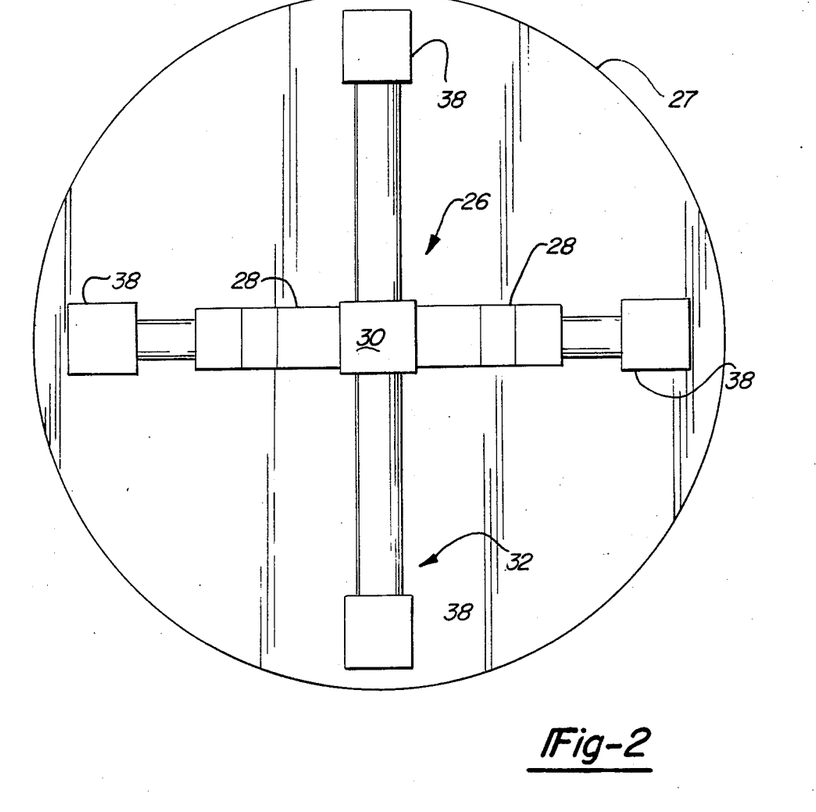
FIG. 2 is a end view of the gripper assembly illustrating the transducer arrangement in accordance with the present invention.
Figure 3:
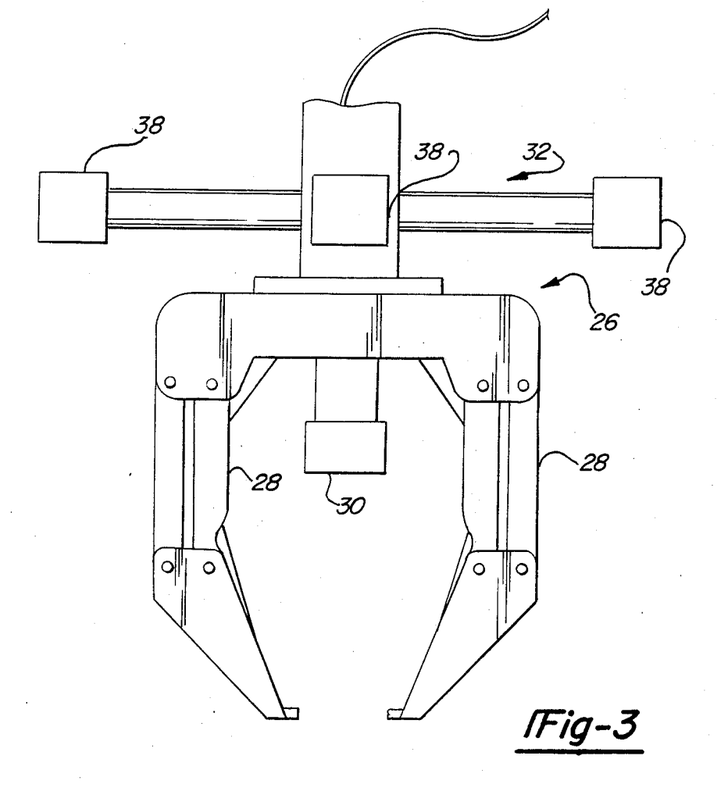
FIG. 3 is a side view of the gripper assembly shown in FIG. 2.

The gripper assembly 26 is shown in FIGS. 2 and 3. The gripper assembly comprises opposing fingers 28 and central acoustic transducer 30. The central acoustic transducer 30 is centrally disposed between gripper fingers 28. The planar acoustic transducer array 32 is symmetrically located in a plane around and is supported by gripper assembly 26. In the preferred embodiment illustrated, array 32 comprises four transducers 38 arranged orthogonally in a plane immediately above gripper assembly 26. A protective shroud 27 is positioned over array 32. This shroud is made of rubber to absorb background noise and enhance the directional charactristics of the array 32.

When array 32 is pulsed, the echo signals received back are evaluated on a continual basis to generate an error signal proportional to the difference between the plane of array 32 and the surface plane of part 20 in bin 22. Thus, when the error signal is nulled, the gripper assembly will be positioned orthogonally to part 20 and position for grasping part 20 in the predetermined orientation.

The controller 14 also includes a search pattern generator 40. Search pattern generator 40 produces the drive signal to wrist 24 of manipulator 12 to slue the gripper assembly 26 in a systematic pattern over bin 22 during the initial search in order to locate the closest part 20.

The control module 36 activates the search pattern generator 40. The search pattern generator 40 output is fed to the robot manipulator 12 and controls the pulsing of central transducer 30 to identify the closest part 20 by echo location. The location or bearing to the closest part 20 is then relayed to the control module 36 which then directs the focus of video camera 16 to the perceived location of object 20. Control module 36 then activates drive module 42 for camera 16 to aim and capture an image of the perceived part 20. This image is then processed by control module 36 and compared to the stored image to identify feature 34 on part 20. Finally, controller 14 includes a laser spotter drive control 44 which positions the laser spotter 18 on the interacting bearing as directed by control module 36. Feature 34 on the part 20 may be confirmed by the use of laser spotter 18. This step is not required; however, the confirmation of the feature 34 using the laser spotter 18 is preferred to minimize errors in feature identification.

Once the feature 34 has been tentatively identified by the control module 36 evaluating the image from video camera 16 against the stored image, control module 36 generates a precise bearing from laser spotter 18 to the feature 34 and transmits this bearing to laser spotter drive control 44. Drive control 44 then aims laser spotter 18 along this bearing.

Laser spotter 18 directs a thin pin point beam of coherent light on feature 34. The light reflected from feature 34 is received by camera 16. A specific narrow range of greyscale values is expected to be reflected off feature 34. Light in this range will be received by video camera 16 if the proper feature has been identified by the comparison between the stored image and the current image from video camera 16 in control module 36. When this greyscale value is received by video camera 16 and acknowledged by control module 36, feature 34 and its location have been confirmed.

In the event that feature 34 is not confirmed by the reflected light of the proper greyscale value as described above, bin 22 may be agitated, or a different portion of bin 22 may be selected by control module 36 and the entire process repeated until confirmation of the feature 34 is made. As the parts 20 are randomly oriented or piled within bin 22, each time an part 20 is removed from bin 22, a new echo pattern will be received by the control module 36 during echo location and thus repetitive picking of the same part by the system will be minimized.

The centroid of the part 20 is calculated once feature location has been confirmed and the bearing from the gripper assembly 26 to the centroid of the part 20 is also calculated by control module 36. The control module 36 then drives the gripper assembly 26 to a predetermined distance from part 20 along this centroid bearing. The planar transducer array 32 is then turned on and pulsed repetitively to properly position the gripper 26 with respect to the part 20.

Initially, the bin picking system is taught to provide a certain output from the transducer array 32 when the part aspect is proper for gripping. The control module 36 receives echo signals from planar array 32, evaluates these signals and generates an error signal which then is fed to the robot manipulator 12 to drive the gripper assembly 26 to the predetermined proper aspect position along the centroid bearing. When the error signal becomes nulled, the gripper assembly 26 is in position so as to grasp part 20 with fingers 28 such that feature 34 is in a predetermined orientation.

The part 20 is then grasped with fingers 28 and control module 36 directs manipulator arm 12 to remove part 20, manipulate it and place the part 20 in a position required by the particular handling sequence. Other robot manipulators may further grasp, process or install the part 20 as may be required in the particular manufacturing process.

Figure 4A:
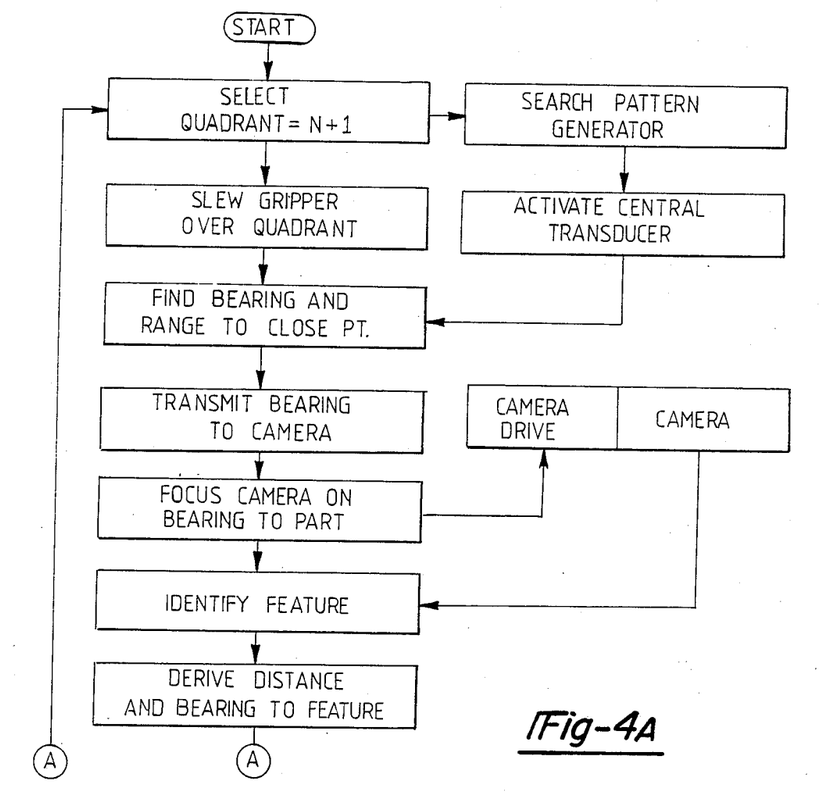
FIGS. 4A and 4B are a flow diagram illustrating the sequence of operation of the bin picking system in accordance with the present invention.
Figure 4B:
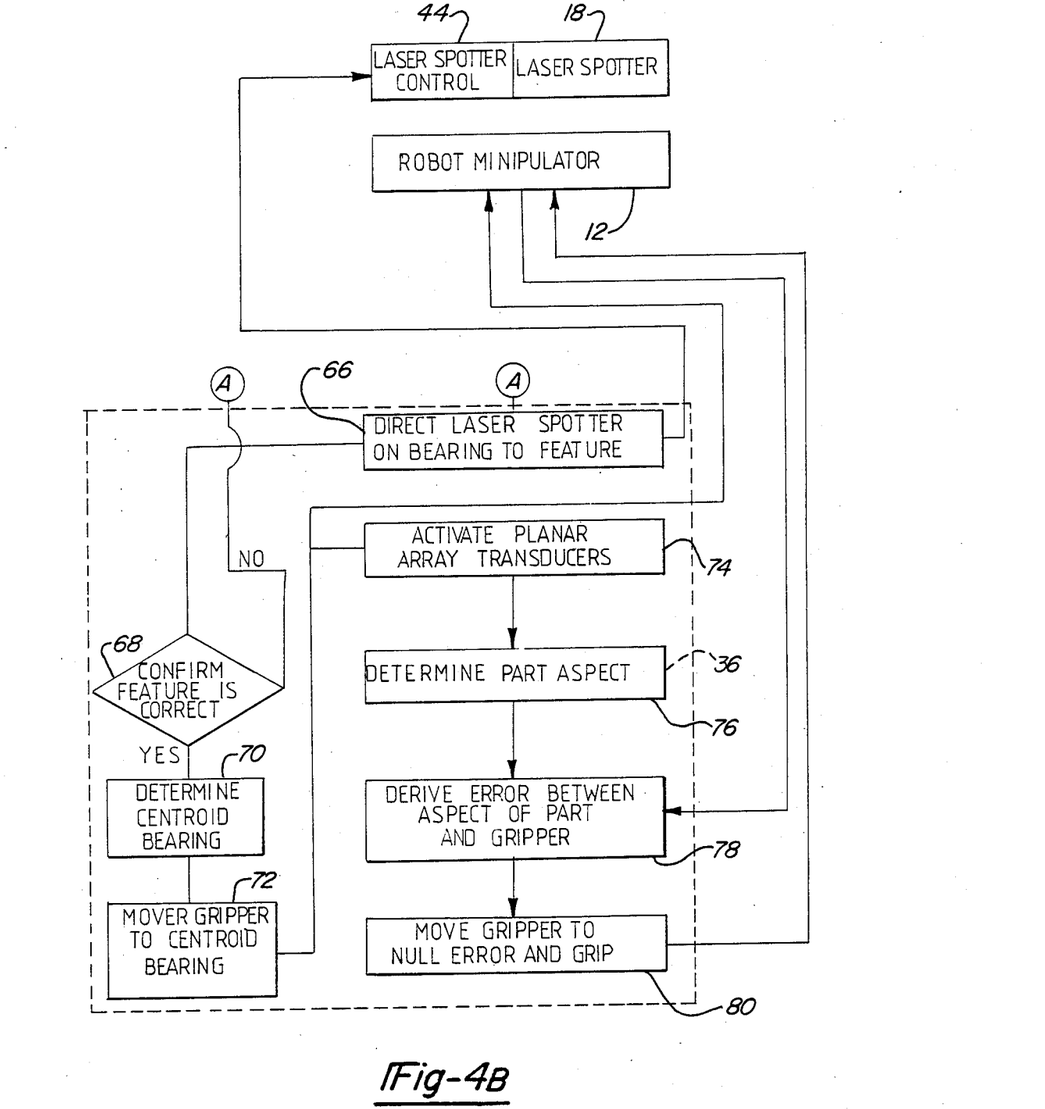

An overall flow diagram of the bin picking system operation is illustrated in FIG. 4. The bin picking operation is started by the operator entering a start command in block 48. The following blocks of operational steps performed by the control module 36 are indicated by the dashed line in FIG. 4. In block 50, the control module 36 of controller 14 selects a quadrant of bin 22 over which the gripper assembly 26 is slued by articulated wrist 24 and turns on the search pattern generator 40. In block 52, the particular search pattern and frequency of pulse transmission from central transducer 30 are prescribed by the search pattern generator 40 within controller 14.

The gripper assembly 26 is positioned, in block 54, over the selected quadrant and slued back and forth over the selected quadrant of bin 22. The bearing and range to the closest part 20 is determined in block 56 by evaluation of the reflected echoes received by central transducer 30. This bearing corresponds to the position of gripper assembly 26 where the echo signal received in control module 36 is maximized.

Control module 36 selects this maximum reflected signal and generates an electrical signal corresponding to the bearing. This bearing signal is then transmitted in block 58 to video camera 16 via camera drive 42.

Camera 16 is in turn directed and focused, in block 60, on the bearing generated during the search. A current image is taken by the video camera 16 and fed to control module 36 in block 62, where the current image is compared with the stored image to tentatively identify the specific predetermined feature 34. Once the feature 34 is tentatively identified in block 62, a bearing signal and distance signal are generated to the feature 34 in block 64. These bearing and distance signals are transmitted in block 66 to laser control 44 to position laser spotter 18. The laser beam from laser spotter 18 is directed on the tentatively identified feature 34 identified by camera 16 in block 62.

The laser beam reflection produces a greyscale value that is detected by camera 16 and analyzed in the control module 36 in block 68 to determine whether the greyscale value falls within a predetermined required range. If the greyscale value is in the proper range, the feature identification is confirmed. If the greyscale value is outside of the proper range, the control module 36 selects a different quadrant or portion of the bin and the sluing sequence is repeated beginning again at block 50.

If the feature is confirmed in block 68, control module 36 then calculates, in block 70, the centroid of part 20 and the bearing from the gripper assembly 26 to the centroid. This bearing and a proportional drive signal is then transmitted in block 72 to the robot manipulator 12 to move the gripper assembly 26 to a predetermined spaced position from the closest part 20. At this position, in block 74, the planar array 32 of acoustic transducers 38 is then activated in block 74.

The spaced relationship between the transducers 38 in the array 32 permits the determination of the aspect or spacial orientation of part 20 with respect to gripper assembly 26. This determination is made in block 76. Each of the transducers 38 receives an echo from part 20 which has an intensity inversely proportional to the distance from the transducer to the reflecting portion of part 20. Block 76 of control module 36 evaluates these returning echoes and then in block 78 derives an error signal between the aspect of part 20 and the aspect of the planar array 32 on the gripper assembly 26. The derived error signal is based on a comparison to a predetermination orientation for gripping which is stored in the memory portion of the control module 36.

This error signal is then used in block 78 to produce a drive signal which is fed in block 80 to the robot manipulator 12. The gripper assembly 26 is then driven by the error signal until the error signal is nulled at which point the gripper assembly 26 is in proper position to grasp part 20.

The error signal is constantly updated through blocks 74, 76, and 78 as manipulator 12 is moved. When a null is achieved, block 80 of the control module 36 then initiates the grasping sequence with fingers 28 to grip the part 20 and finally relocate part 20 as may be required in the particular manufacturing sequence.

The bin picking system as above described is particularly adapted to picking workpieces out of a bin in a situation in which the workpieces are in an unoriented, overlapping condition. The combination of an acoustic sensor array for bearing, distance, and aspect determination and a video camera for feature identification provides a simple approach to solving the pin picking problem. This system is simpler to implement than the heretofore available prior art systems which are extremely complex, 3-dimensional machine vision systems requiring costly image processing equipment.

While the above description constitutes the preferred embodiments of the present invention, it will be appreciated that the invention is susceptible to modification, variation and change, without departing from the proper scope and fair meaning of the accompanying claims.

What is claimed is:

1. A system for gripping with a robot manipulator a randomly oriented shaped object having a predetermined feature, said manipulator gripping said object in a predetermined orientation, said system comprising:
   memory means for storing an image of said object, said stored image of said object showing said predetermined feature on said object in said predetermined orientation;
   acoustic transducer means mounted on said manipulator for emitting and receiving acoustic signals and converting said acoustic signals received to electrical signals;
   first control means for sluing said manipulator over a predetermined area within which said object is located and for evaluating said received electrical signals to locate said object and generate a bearing signal representative of the bearing and distance to said object;
   video means for capturing a current image of said object at said bearing and comparing said image with said stored image of said object to identify and locate said feature on said object;
   means for calculating a drive bearing to the centroid of said object from the location of said feature and said bearing signal and moving said manipulator along said drive bearing to a predetermined distance from said object;
   acoustic transducer array means mounted on said manipulator emitting and receiving acoustic signals and converting said received signals to electrical signals proportional to the aspect of said object when said manipulator is positioned said predetermined distance from said object along said drive bearing;
   second control means for interpreting said electrical signals from said array means and comparing said signals to said stored image to produce an error drive signal to said manipulator, said error drive signal being proportional to the error between said aspect of said object and the position of said manipulator, said drive signal moving said manipulator along said drive bearing to null said error drive signal thus orienting said manipulator to grip said object in said predetermined orientation when said error drive signal is nulled.

2. The system according to claim 1 wherein said video means comprises:
   camera means spaced from and directed toward said object for capturing an electronic image of said object;
   a laser light source spaced from said object and said camera means, said source being aimed along said bearing to said feature; and
   signal processing means connected to said camera means for evaluating light reflected by said feature to said camera means to confirm the location of said feature.

3. The system according to claim 1 wherein said manipulator includes an articulated gripper assembly having a pair of opposing gripping fingers for grasping said object, said acoustic transducer means comprising an acoustic transducer centrally located between said fingers, and signal processing means for comparing said emitted and received acoustic signals to determine the distance between said object and said transducer.

4. The system according to claim 3 wherein said memory means, said first and second control means and said means for calculating comprise a digital computer.

5. A method for finding and gripping with a robot manipulator a randomly oriented shaped object in a predetermined orientation from a bin of vertically shaped objects, said manipulator including a gripper assembly having an articulated wrist having an opposing pair of gripping fingers for grasping said shaped objects, said method comprising the steps of:
   a. positioning said gripping assembly over said bin;

b. activating an acoustic transducer mounted between said fingers so as to emit and receive acoustic pulses;
c. sluing said wrist in a predetermined path over a portion of said bin;
d. calculating the phase difference between said emitted and received pulses to determine a closest object in said bin;
e. generating an electrical signal proportional to the bearing of said closest object;
f. focusing a video camera on said bearing to capture an image of said closest object;
g. comparing said image with a stored image of said object to identify a feature on said object;
h. generating a bearing from said camera to said feature;
i. directing a laser light beam along said bearing to said feature, said light beam reflecting from said feature;
j. detecting and comparing the intensity reflected laser light from said feature to a predetermined intensity to confirm the location of said feature;
k. calculating a bearing to the centroid of said object if the feature location is confirmed;
l. driving said gripper assembly to a predetermined distance from said object along said bearing to the centroid of said object;
m. activating a planar array of acoustic transducers mounted symmetrically on said gripper assembly to emit and receive acoustic signals;
n. processing said received acoustic signals from said array to determine the aspect of said object;
o. generating an error drive signal proportional to the error in position between said gripper assembly and said aspect and position of object;
p. moving said gripper assembly along said bearing to null said error drive signal; and
q. grasping said object with said fingers when said error drive signal is nulled thereby grasping said object in said predetermined orientation.

* * * * *